Nov. 4, 1952     E. T. YOUNG     2,616,187
WELL SURVEYING INSTRUMENT
Filed Feb. 8, 1950     2 SHEETS—SHEET 1
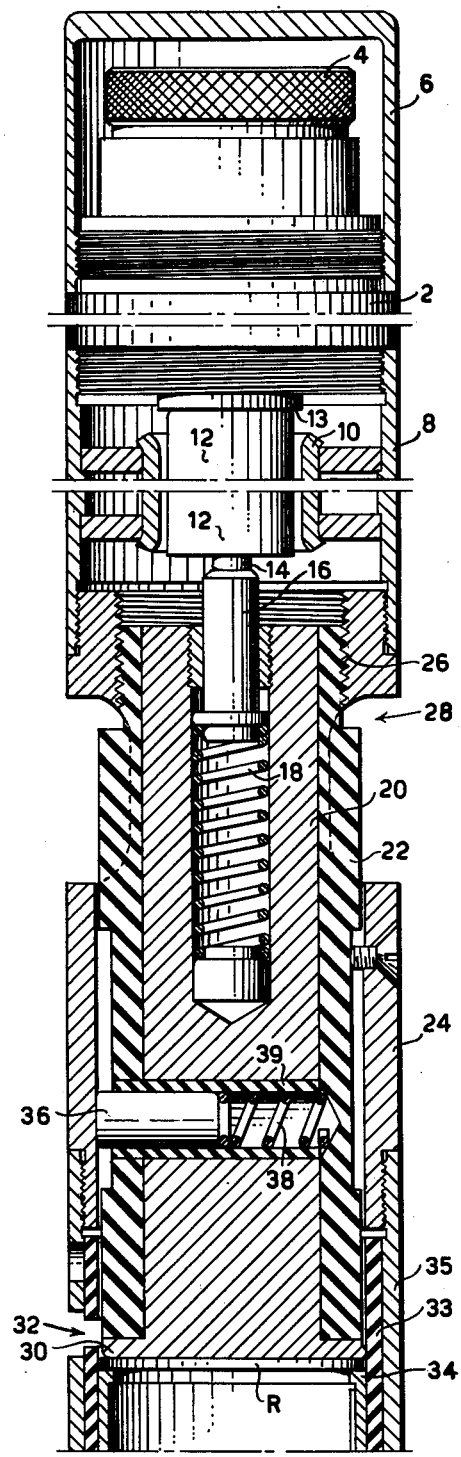
FIG. IA.
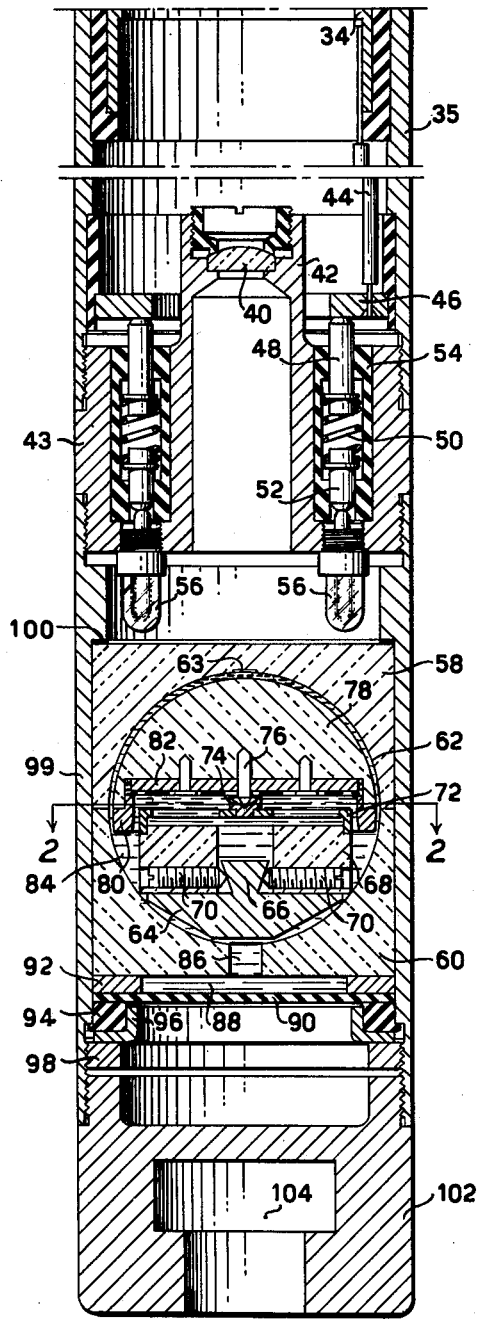
FIG. IB.
INVENTOR.
EINAR T. YOUNG
BY *Busser & Harding*
ATTORNEYS.

Nov. 4, 1952 E. T. YOUNG 2,616,187
WELL SURVEYING INSTRUMENT
Filed Feb. 8, 1950 2 SHEETS—SHEET 2

INVENTOR.
EINAR T. YOUNG
BY
Bessey, Harding
ATTORNEYS.

Patented Nov. 4, 1952

2,616,187

UNITED STATES PATENT OFFICE 2,616,187

WELL SURVEYING INSTRUMENT

Einar T. Young, Ridley Park, Pa., assignor to Sperry-Sun Well Surveying Company, Philadelphia, Pa., a corporation of Delaware Application February 8, 1950, Serial No. 143,072

12 Claims. (Cl. 33—205)

This invention relates to a well surveying instrument and particularly to a well surveying instrument of photographic magnetic type.

Well surveying instruments in use at the present time, when intended to give records of both inclination and azimuthal direction of inclination, are generally photographic and involve separate sensitive elements for indicating the inclination and azimuth. Such instruments may be either single shot or multiple shot depending upon whether one or a plurality of records is to be made in a single run in a well. As will be evident hereafter, the present invention is applicable to either type of instrument, though a single shot type is specifically disclosed.

Difficulties have been encountered in the above-mentioned types of well surveying instruments in that mountings, particularly of compass elements, involve frictional restraints on motion which are sufficient to resist the small magnetic moments which serve to turn the compass elements and hence inaccuracy of azimuthal readings may occur. While highly sensitive compass mountings are available for other uses, well surveying instruments require rugged mountings in view of the shocks to which the instruments are subjected in passing through bore holes and in handling at the surface. It has been difficult to achieve sufficiently frictionless mountings consistent with requirements of ruggedness.

Furthermore, in most successful instruments it has been necessary to provide separate elements for indicating direction and inclination with consequent difficulties in maintaining completely accurate alignment of the various elements to secure thoroughly reliable results.

In accordance with the disclosure of my application Serial Number 102,474, filed July 1, 1949, there is provided a single indicating element for indications of both inclination and the azimuth of the inclination. The mounting of this combination element is such as to give rise to extreme sensitivity but, nevertheless, a high degree of resistance to shocks and wear. This is achieved by mounting the indicating element through a point resting in a jewelled socket with reduction of the force present between the point and socket achieved by the major support of the indicating element by buoyancy of a liquid. By so constructing the indicating element and so choosing the liquid that its effective weight is very small, frictional forces at the contact of the point and socket may be made very minute. At the same time the adoption of the arrangement just mentioned effectively reduces to a minimum any inertial forces which may be produced by shocks even when the instrument is placed on its side or inverted. In effect, the indicating element becomes approximately only a part of a liquid in which it is immersed having an effective density only very slightly greater (or less) than that liquid.

In said prior application there is disclosed a well surveying instrument which is capable of being used at large angles of inclination. This condition is achieved by providing a support which, while relatively insensitive to inclination, maintains approximately a definite position with respect to the horizontal. On this element, in turn, there is sensitively mounted the indicating element which is photographed to obtain inclination and azimuth.

The present invention achieves the objects of the invention of said prior application as set forth above, but in particular in accordance with the present invention there is secured an improved arrangement for the measurement of large angles of inclination. Furthermore, in accordance with the present invention there is still further reduced the possibility of damage due to inertial forces.

The general objects of the invention directed at the provision of a satisfactory well surveying instrument will be apparent from the foregoing. These general objects and other objects relating to details of construction whereby the desired ends are achieved will become apparent from the following description read in conjunction with the accompanying drawings in which:

Figures 1A and 1B taken together show a vertical axial section through one form of well surveying instrument provided in accordance with the invention;

Figure 2:
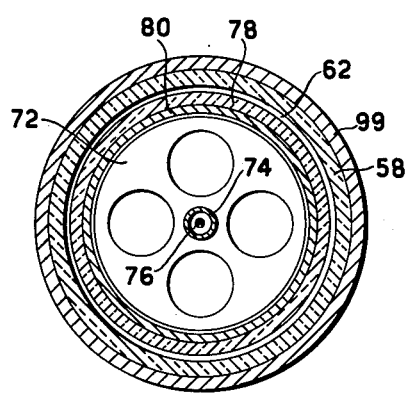
Figure 2 is a transverse section taken on the plane indicated at 2—2 in Figure 1B.

Referring first to Figures 1A and 1B there is disclosed therein an instrument which is adapted for use with inclination angles ranging up to 90°.

The instrument shown in these figures is that which is, in use, enclosed in a protective casing of usual type capable of withstanding pressures which may be encountered in deep holes. Such protective casings are commonly used in the art and need not be described herein. Generally speaking, the instrument which is shown is mounted in such a protective casing in alignment with the axis thereof through the medium of shock absorbing springs to minimize the possibility of damage to the sensitive parts of the instrument due to shocks which are encountered in operation.

The instrument comprises a timing clockwork indicated at 2 which may take various forms, for example, as disclosed in the application of Roland Ring, Serial No. 629,052, filed November 16, 1945, which mechanism controls a switching means, included therein, controlling the flow of current to one or more lamps supplying illumination for the photographing of the indicating element. This timing mechanism is provided with a winding knob 4 which may be set to predetermine a delay of the making of a record in the usual fashion. A cover 6 threaded to the clockwork mechanism serves to protect it from damage in handling.

Threaded to the clockwork mechanism is a tube 8 which carries internally a tubular member 10 for the reception of a suitable number of flashlight batteries 12 arranged in series. The casing of the uppermost battery engages a contact element 13 forming part of the timing mechanism and is at proper times grounded to the casing by the closure of the switch in this mechanism. The positive terminal 14 of the lowermost battery engages the upper end of a pin 16 which is pressed upwardly by a spring 18 to maintain the batteries in contact with each other and with the contact element 13 of the clockwork mechanism. This spring is received in the bore of a conductive member 20 which is carried by the interior of an insulating sleeve 22 which is housed in a tubular member 24 and threaded into this member at 26. Openings 28 in the member 24 expose the member 22 for rotation so that its lower end 30 may be moved to open or close a slot 32 through which a record member R can be inserted and removed, the member 22 being arranged to press the record member R against a seat 34 located in an insulating sleeve 33 in a tube 35. As will be evident from the drawings the arrangement of conductive and insulating members is such that an electrical connection from the battery terminal is secured through the pin 16, spring 18 and member 30 to the record member which comprises a disc of photographic paper carried by a backing disc of metal with the edges turned over the edges of the paper with the result that conduction occurs through the metal part of the record member to the conductive seat 34. This conductive path is insulated from the housing. While the member 22 should be freely rotatable by the fingers inserted through the openings 28 in the housing its free rotation under the impact of shocks is prevented by the provision of a pin 36 backed up by a spring 38, both mounted in a transverse insulating tube 39, the pin 36 bearing on the interior of the tubular member 24 to provide friction.

A metallic coupling member 43 is threaded into the lower end of the tube 35 and provides a support 42 for a centrally located lens 40 which, as will appear hereafter, projects an image of the indicating element on the record member. A conductive ring 46, also insulated from the housing, is connected through a wire 44 to the seat 34. In the coupling member 43 there are provided insulating tubes 54 which receive pins 48 and 52 urged outwardly by springs 50 to provide electrical contacts with central contacts of lamps 56, threaded bases of which are threaded into openings in coupling member 43 to provide ground connections. It will be evident from the above that the filaments of lamps 56 are in a circuit with the batteries 12 and the switch of the timing mechanism 2 so that these filaments will be illuminated when the switch is closed.

Below the lamps 56 there is provided the direction-inclination unit. This comprises a pair of transparent members 58 and 60, desirably of glass (though they may be of metal, the upper one being provided with a glass window), which are clamped together and provide a spherical chamber indicated at 62 at the top of which in the axis of the instrument there is inscribed a reference marking at 63, for example, consisting of a small circle with a cross therein. Within the spherical chamber there is located a counterweight, indicated at 64, the lower surface of which is of frusto-conical shape, as indicated in the drawing. Desirably, the circular edge at the large end of the frustum is arranged to engage and rest on the spherical inner surface of the chamber while the circle at the smaller end of the frustum just clears this surface. The circular edge at the large end of the frustum thus has at least a three point contact with the spherical surface which will define the position of the counterweight and its associated elements with respect to the center of the spherical surface, though, of course, there may be more than three points of contact. The counterweight has a conical central projection indicated at 66, and arranged in contact with its flat upper surface there is the bearing support indicated at 68 provided with four centering screws illustrated at 70 which bear upon the projection 66 and serve for centering adjustment of the bearing support with respect to the counterweight. A bearing mount 72 is secured to the bearing support 68 by an annular flange and has a thin metal portion extending across the bearing support and desirably provided with large openings so as to have a slight springing action, this portion of the member 72 clearing the bearing support at its center so that it may flex slightly downwardly. At its center the member 72 carries the jewel socket 74 for the reception of the pointed end of a pin 76 secured in the hemispherical float 78 which at its lower portion carries a counterweight ring 80. Secured to the float 78, for example by pins, is a compass needle 82. The spherical chamber 62 is filled with a suitable liquid 84 having a substantial buoyant action on the elements within the chamber. At its lower end the chamber 62 communicates with a central opening 86 leading to a space 88 above a flexible diaphragm 90 which is spaced from the member 60 by a spacing ring 92 against which it is pressed by the gasket 94, the retaining annulus 96 and a ring 98 threaded into the portion 99 of the housing. This ring 98 forces the entire fixed assembly against a gasket 100 which engages a shoulder in the interior of the housing member 99. Thus, the chamber 62 is held in fixed position with respect to the optical system of the instrument. Into the housing member 99 there is threaded the lower plug 102 containing the usual T-opening 104 by which the housing may be hooked to a bolt forming part of the shock-absorbing arrangements of conventional type serving to support the instrument in its protective casing.

Considering first the assembly comprising the hemisphere 78, the counterweight ring 80, pin 76 and the compass needle, this assembly is so constructed with respect to the liquid in the chamber 62 in which it is immersed that its effective specific gravity is only very slightly greater than that of the liquid. Its effective center of gravity is directly below its center of buoyancy so that when the instrument is vertical the axis of the indicating element is also precisely vertical. (By effective center of gravity there is meant the apparent center of gravity with the compass needle magnetized, this being slightly different from the true center of gravity which would be the apparent one with the needle unmagnetized.)

It may be here noted that for stability in vertical position certain conditions must be attained: not only must the point of mounting pin 76 be in a straight line with the effective center of gravity and the center of buoyancy, but the buoyant upward force (determined by the volume of the assembly and choice of liquid), must be such that the product of this force by the distance of the center of buoyancy from the point of support must exceed the product of the weight of assembly by the distance of the effective center of gravity from the point of support. If the former product is less than the latter, the assembly will fall over.

In the case of the assembly comprising the counterweight 64, the bearing support 68, the bearing mount 72, the jewel bearing 74, and the other parts of this assembly, considerations similar to those just described also apply, in that this assembly should also have an effective specific gravity which is only very slightly greater than that of the liquid and there should be precise vertical alignment between the center of gravity and the center of buoyancy with the central axis of the circular base of the conical frustum which rests on the spherical surface of the chamber 62.

Under the conditions outlined it will be evident that there will be a minimum frictional bearing of the lower assembly upon the spherical surface and, accordingly, this assembly will normally assume a position with its central axis almost vertical. There may be some slight departure from vertical arrangement of its axis due to friction. However, all that is required of this assembly is that it should maintain approximately vertical the axis of the jewel bearing in which rests the point of the pin 76. So long as the axis of the jewel bearing is approximately vertical, the axis of the member 78 and pin 76 will be very precisely vertical. The supporting assembly is so constructed that the apex of the jewel socket in which the pin 76 rests will be precisely in the center of the spherical chamber 62 which center, in turn, is precisely in the central axis of the instrument. The surface of the member 78 is, in turn, centered about the point of the pin 76. Accordingly, the hemispherical surface of member 78 is always concentric with the spherical surface of the chamber.

The materials used for the assemblies within the spherical chamber are subject to considerable choice, and may be formed of glass, metal and/or plastics in various combinations. All that is required is that the liquid filling the chamber 62 and these materials should be relatively chosen so as to secure the effective specific relationships described above. For example, as the liquid there may be used various heavy transparent organic liquids such as the brominated hydrocarbons of various types having specific gravities in excess of two and ranging upwardly approximately to three. Various of said hydrocarbons have high boiling points which will permit the instrument to be used in deep holes having high temperatures therein without the production of excessive vapor pressures. As examples there may be cited various tetrabromoethanes, tribromoethylene, and bromoform.

The expansible chamber 88 bounded by the flexible diaphragm 90 provides for expansion and contraction of the liquid and avoids the formation of air bubbles which would tend to obscure the record.

The liquid effects dynamic damping of oscillations of the two assemblies therein, without, however, preventing the assemblies from attaining vertical positions. It will be noted that the assemblies very nearly fill the spherical chamber and the result is that shocks are very effectively damped, the parts being unable to move sufficiently to give rise to any inertial forces which may lead to damage or destruction.

Figure 3:
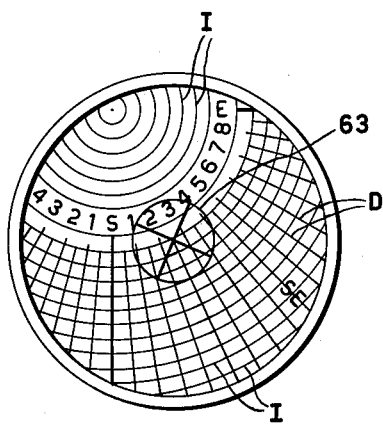
Figure 3 is a plan view of a record produced by the instrument when used at low angles of inclination.
Figure 4:
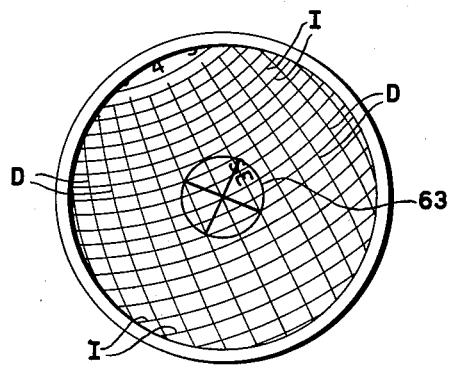
Figure 4 is a view similar to Figure 3 but showing the type of record produced at a larger angle of inclination.

The markings which may be carried by the hemispherical surface of member 78 will be clear from Figures 3 and 4 which show records made respectively at low and high angles of inclination. These markings are, in effect, latitude and longitude markings on the surface of the hemisphere 78. They may, for example, comprise concentric circles I about the polar axis of the hemisphere serving for the measurement of inclination and radial markings D consisting of portions of great circles which would intersect at the polar axis for the indication of azimuth, these last markings bearing a proper and known relation to the axis of the magnetic needle 82. Suitable numerical and lettered markings are also provided to make the record directly readable. The reference circle and cross hairs referred to as located at 63 provide a reference against which the markings on the hemisphere may be read. The markings on the hemisphere may be white markings on a black background or conversely may consist of black markings on a white background.

The manipulations of the instrument in making a record are substantially the same as those involved in similar instruments heretofore. A record disc is inserted in the instrument through the opening 32 and clamped in position as illustrated in Figure 1A by the turning of the member 22. The disc may be fed into the instrument from a suitable record disc holder engageable with the exterior of the instrument about the slot 32 in light-tight fashion. The timing mechanism is then set for a predetermined delay and the instrument illustrated enclosed in its protective casing and lowered into a hole either on a wire line or by being dropped as a go-devil within a drill stem, the lower end of which may be provided with a non-magnetic sub so that directional readings may be made. Alternatively, the instrument may drop through the opening in the bit so as to project into a region below the bit sufficiently free of magnetic influences of the drill string and bit, the protective casing being caught by a suitable arrangement in or above the bit. After the proper time has elapsed for the making of a record the instrument is then withdrawn and the record removed and developed.

It may be here noted that the invention may be carried out in a form inverted from that illustrated in Figures 1A and 1B by having the assemblies within the spherical chamber 62 lighter than the liquid in which they are immersed so that they may be floated upwardly. In this case, of course, the assemblies should be of slightly less specific gravity than the liquid. In common in the two cases the specific gravities of the assemblies and the liquid should be approximately equal with the net result that all frictional forces will be at a minimum and the indicating hemisphere will attain a vertical and properly magnetically directed position. In each case the center of buoyancy should be axially above the effective center of gravity so that in a condition of equilibrium there will be central alignment with respect to the spherical chamber. In both cases the approximately equal specific gravities will minimize the possibility that due to any shocks sufficient forces will be set up to do any damage to the parts.

It may be noted that either in the arrangement last described or in that particularly illustrated in Figure 1B, the positions of the pin 76 and socket 74 may be interchanged.

It will be evident that various changes may be made in specific details of the instrument, for example in the matter of the markings used and in the particular elements constituting the assemblies within the spherical chamber, without departing from the principles of the invention.

What is claimed is:

1. An inclination and direction indicator comprising a chamber presenting, at least in part, a spherical surface, liquid in the chamber, an indicating element immersed in liquid in the chamber, and a supporting element in the chamber, one of said elements including a pointed pin and the other of said elements providing a socket for the reception of said pin, said indicating element including a magnetized compass member and having markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly different from the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly different from, the specific gravity of said liquid so that said axis of the supporting element will normally substantially coincide with a vertical line through the center of said spherical surface.

2. An inclination and direction indicator comprising a spherical chamber, liquid in the chamber, an indicating element immersed in liquid in the chamber, and a supporting element in the chamber, one of said elements including a pointed pin and the other of said elements providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly different from the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly different from, the specific gravity of said liquid so that said axis of the supporting element will normally substantially coincide with a vertical line through the center of said spherical surface, said supporting element normally positioning the point of engagement between the pin and socket substantially at the center of said spherical chamber.

3. An inclination and direction indicator comprising a spherical chamber, liquid in the chamber, an indicating element immersed in liquid in the chamber, and a supporting element in the chamber, one of said elements including a pointed pin and the other of said elements providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly different from, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly different from, the specific gravity of said liquid so that said axis of the supporting element will normally substantially coincide with a vertical line through the center of said spherical surface, said supporting element normally positioning the point of engagement between the pin and socket substantially at the center of said spherical chamber, and said semi-spherical surface of the indicating element being substantially concentric with said point of engagement and having a radius slightly less than the radius of said spherical chamber to provide a slight clearance between the semi-spherical surface and the spherical chamber wall.

4. An inclination and direction indicator comprising a chamber presenting, at least in part, a spherical surface, liquid in the chamber, an indicating element immersed in liquid in the chamber, and a supporting element in the chamber, one of said elements including a pointed pin and the other of said elements providing a socket for the reception of said pin, said indicating element including a magnetized compass member and having markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly greater than, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly greater than, the specific gravity of said liquid so that said axis of the supporting element will normally substantially coincide with a vertical line through the center of said spherical surface.

5. An inclination and direction indicator comprising a spherical chamber, liquid in the chamber, an indicating element immersed in liquid in the chamber, and a supporting element in the chamber, one of said elements including a pointed pin and the other of said elements providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly greater than, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly greater than, the specific gravity of said liquid so that said axis of the supporting element will normally substantially coincide with a vertical line through the center of said spherical surface, said supporting element normally positioning the point of engagement between the pin and socket substantially at the center of said spherical chamber.

6. An inclination and direction indicator comprising a spherical chamber, liquid in the chamber, an indicating element immersed in liquid in the chamber and a supporting element in the chamber, one of said elements including a pointed pin and the other of said elements providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly greater than, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly greater than, the specific gravity of said liquid so that said axis of the supporting element will normally substantially coincide with a vertical line through the center of said spherical surface, said supporting element normally positioning the point of engagement between the pin and socket substantially at the center of said spherical chamber, and said semi-spherical surface of the indicating element being substantially concentric with said point of engagement and having a radius slightly less than the radius of said spherical chamber to provide a slight clearance between the semi-spherical surface and the spherical chamber wall.

7. An inclination and direction indicator comprising a chamber presenting, at least in part, a spherical surface, liquid in the chamber, an indicating element immersed in liquid in the chamber, and a supporting element in the chamber, said indicating element including a pointed pin and said supporting element providing a socket for the reception of said pin, said indicating element including a magnetized compass member and having markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly different from, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly different from, the specific gravity of said liquid so that said axis of the supporting element will normally substantially coincide with a vertical line through the center of said spherical surface.

8. An inclination and direction indicator comprising a spherical chamber, liquid in the chamber, an indicating element immersed in liquid in the chamber, and a supporting element in the chamber, said indicating element including a pointed pin and said supporting element providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly different from, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly different from, the specific gravity of said liquid so that said axis of the supporting element will normally substantially coincide with a vertical line through the center of said spherical surface, said supporting element normally positioning the point of engagement between the pin and socket substantially at the center of said spherical chamber.

9. An inclination and direction indicator comprising a spherical chamber, liquid in the chamber, an indicating element immersed in liquid in the chamber, and a supporting element in the chamber, said indicating element including a pointed pin and said supporting element providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly different from, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly different from, the specific gravity of said liquid so that said axis of the supporting element will normally substantially coincide with a vertical line through the center of said spherical surface, said supporting element normally positioning the point of engagement between the pin and socket substantially at the center of said spherical chamber, and said semi-spherical surface of the indicating element being substantially concentric with said point of engagement and having a radius slightly less than the radius of said spherical chamber to provide a slight clearance between the semi-spherical surface and the spherical chamber wall.

10. An inclination and direction indicator comprising a chamber presenting, at least in part, a spherical surface, liquid in the chamber, an indicating element immersed in liquid in the chamber, and a supporting element in the chamber, said indicating element including a pointed pin and said supporting element providing a socket for the reception of said pin, said indicating element including a magnetized compass member and having markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly greater than, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly greater than, the specific gravity of said liquid so that said axis of the supporting element will normally substantially coincide with a vertical line through the center of said spherical surface.

11. An inclination and direction indicator comprising a spherical chamber, liquid in the chamber, an indicating element immersed in liquid in the chamber, and a supporting element in the chamber, said indicating element including a pointed pin and said supporting element providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly greater than, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly greater than, the specific gravity of said liquid so that said axis of the supporting element will normally substantially coincide with a vertical line through the center of said spherical surface, said supporting element normally positioning the point of engagement between the pin and socket substantially at the center of said spherical chamber.

12. An inclination and direction indicator comprising a spherical chamber, liquid in the chamber, an indicating element immersed in liquid in the chamber, and a supporting element in the chamber, said indicating element including a pointed pin and said supporting element providing a socket for the reception of said pin, said indicating element including a magnetized compass member and having a semi-spherical surface carrying markings thereon in correspondence with said compass member, the center of buoyancy of said indicating element being above its effective center of gravity when the pin is seated in the socket, with said centers vertically aligned with the point of said pin when the indicator is in equilibrium, the specific gravity of said indicating element approximating, but being slightly greater than, the specific gravity of said liquid to provide a small net force effecting seating between the pin and socket, and said supporting element being substantially symmetrical about an axis joining its center of gravity and its center of buoyancy, having a portion bearing on the spherical surface of said chamber to provide at least a three point contact between the supporting element and the spherical surface of the chamber to define the position of the support with respect to the center of said spherical surface, and having a specific gravity approximating, but being slightly greater than, the specific gravity of said liquid so that said axis of the supporting element will normally substantially coincide with a vertical line through the center of said spherical surface, said supporting element normally positioning the point of engagement between the pin and socket substantially at the center of said spherical chamber, and said semi-spherical surface of the indicating element being substantially concentric with said point of engagement and having a radius slightly less than the radius of said spherical chamber to provide a slight clearance between the semi-spherical surface and the spherical chamber wall.

EINAR T. YOUNG.

REFERENCES CITED

The following references are of record in the file of this patent:

UNITED STATES PATENTS

| Number | Name | Date |
|---|---|---|
| 856,990 | Schweder | July 11, 1907 |
| 1,294,710 | Roland | Feb. 18, 1919 |
| 1,376,727 | Pentz | May 3, 1921 |
| 1,424,804 | Day | Aug. 8, 1922 |
| 1,987,696 | McLaughlin | Jan. 15, 1935 |
| 2,026,919 | Stright | Jan. 7, 1936 |
| 2,124,892 | Nichols | July 26, 1938 |
| 2,192,148 | Otto | Feb. 27, 1940 |
| 2,428,346 | White | Sept. 30, 1947 |

FOREIGN PATENTS

| Number | Country | Date |
|---|---|---|
| 3,644 | Great Britain | 1813 |
| 117,161 | Great Britain | 1918 |